United States Patent

Adams

[11] 4,092,796
[45] June 6, 1978

[54] FISHING HOOK

[76] Inventor: George Adams, Box 297, Grover City, Calif. 93433

[21] Appl. No.: 673,209

[22] Filed: Apr. 2, 1976

[51] Int. Cl.² ............... A01K 91/04; A01K 83/00
[52] U.S. Cl. .................................................. 43/44.83
[58] Field of Search ............... 43/44.83, 44.84, 44.85, 43/44.86, 44.82, 44.81, 43.16, 44.8, 44.6, 44.4, 44.2, 43.6, 43.2, 42.49; 24/158, 159

[56] References Cited

U.S. PATENT DOCUMENTS

| 941,039 | 11/1909 | Peirce, Jr. | 24/128 |
|---|---|---|---|
| 1,601,292 | 9/1926 | Burns | 43/44.83 |
| 1,928,367 | 9/1933 | Buddle | 43/42.29 |
| 2,995,858 | 8/1961 | Rathmann | 43/44.8 |
| 3,636,594 | 1/1972 | Faivre | 24/128 |
| 3,724,116 | 4/1973 | Lindner et al. | 43/44.83 |
| 3,878,637 | 4/1975 | Flower | 43/44.83 |
| 3,898,760 | 8/1975 | Klein | 43/44.83 |

Primary Examiner—Louis G. Mancene
Assistant Examiner—Robert P. Swiatek
Attorney, Agent, or Firm—Harvey S. Hertz

[57] ABSTRACT

A fishing hook is formed of a shank having a hook terminating at one end thereof and a fishing line coupler terminating at the other end of the shank. The fishing line coupler includes a wire bent upon itself to define a leading stretch of arcuate contour, an inner side follower stretch integrally connected at one end to the shank and at the other end to one end of the leading stretch, and an outer side follower stretch integrally connected at one end to the other end of the leading stretch and terminating at a free end. An aperture is formed in the leading stretch for enabling a leader to pass therethrough with the knot of the leader lodging on the adjacent surfaces of said inner side follower stretch and the outer side follower stretch.

2 Claims, 6 Drawing Figures

U. S. Patent   June 6, 1978   4,092,796 ered in connection with the accompanying drawings in which like reference numerals designate like parts throughout the Figures.

FISHING HOOK

BACKGROUND OF THE INVENTION

1. Field of the Invention

The field of art to which the invention pertains includes the field of fishing hooks, particularly, with respect to a fishing hook line coupler for lodging a leader line knot between adjacent surfaces of the line coupler.

2. Background of the Invention

Conventional fishing hooks contain fishing line couplers for securing a fishing line leader thereto. Typically, an aperture is formed in the hook, enabling the fishing line leader to pass therethrough. A knot is formed at the end of the leader enabling the leader to be secured to the fishing hook. When a force is applied to the leader, it has been found that unless the knot is secure it can become loose or the knot and leader can pass through the aperture. Alternatively, the line coupler can be bent upon itself to form the reduced opening for securing the knot and leader to the line.

Known prior art includes U.S. Pat. Nos. 86,154; 1,471,959; 2,138,702; 2,457,428; and 2,995,858.

The invention provides a novel fishing hook having a leader coupler for retaining the knotted portion thereof in a secure manner when a force is applied to the leader. The leader coupler enables the leader to be secured to the fishing hook without fear of the knot passing through an opening formed in the leader coupler.

SUMMARY OF THE INVENTION

A fishing hook comprising a shank having a hook terminating one end thereof and a fishing line coupler terminating the other end thereof. The fishing line coupler includes a wire bent upon itself to define a leading stretch of arcuate contour, an inner side follower stretch integrally connected at one end to said shank and at the other end to one end of said leading stretch, and an outer side follower stretch integrally connected at one end to the other end of said leading stretch and terminating in a free end. An aperture is formed in the leading stretch for enabling a leader to pass therethrough with a knot of said leader lodging in the adjacent surfaces of said inner side follower stretch and the outer side follower stretch.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
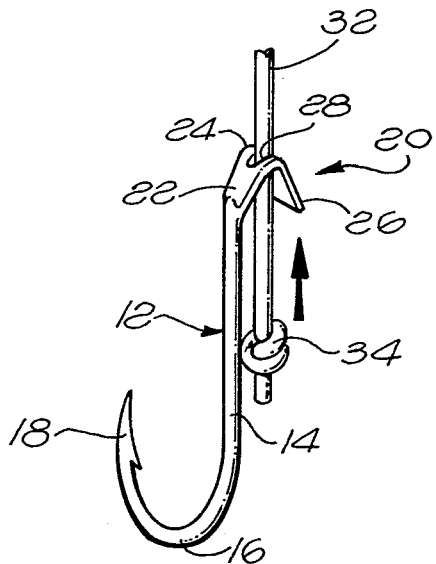
FIG. 1 is a perspective view of a fishing hook having a fishing line coupler in accordance with the invention.

Referring now to the drawings, there is shown in FIG. 1 a fishing hook 12 constructed in accordance with the principles of the invention. The fishing hook 12 includes a shank 14 having a hook 16 integrally formed at one end thereof and terminating at a barbed point 18.

A fishing line coupler, in accordance with the invention, is generally indicated at 20. The coupler 20 together with the shank and hook portion are normally formed with an integral single length of spring wire of desired gauge and length as is conventional.

The fishing line coupler 20 includes an inner side follower stretch 22, one end of which is integrally formed with an end of the shank 14 and the other end of which is integrally formed with one end of a leading stretch 24. The leading stretch 24 is normally formed of an arcuate contour and is integrally formed at its other end to the outer side follower stretch 26. The free end of the outer side follower stretch 26 is bent so that the coupler 20 is formed of generally either a V-shaped or U-shaped configuration as can be seen more clearly in FIG. 2.

An elongated aperture 28 is formed at the center of the lead stretch 24 and is of sufficient width at its widest point (FIG. 3) so that a leader 32 can pass therethrough. Once the leader has passed through the elongated aperture 28 a conventional knot 34 is fastened at its end. When the leader is pulled in the direction of the arrow of FIG. 1, the leader knot 34 is lodged between the adjacent surfaces of the inner side follower stretch 22 and the outer side follower stretch 26. Thus, the forces on the knot 34 are taken up by the stretch side walls and the entire force applied to the leader is not directly applied to the end of the knot passing through the aperture 28. Thus, the knot 34 cannot be released or forced through the aperture should the knot be of a size only slightly greater than the size of the aperture 28.

Figure 2:
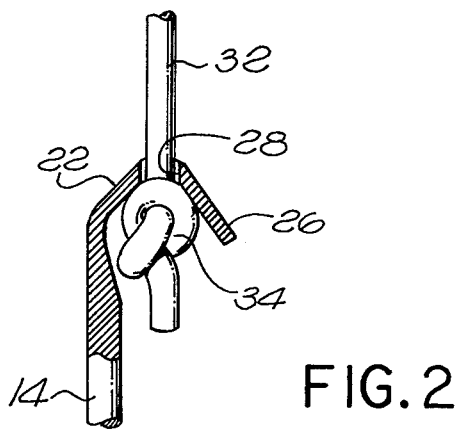
FIG. 2 is a side view in cross section, partially broken away, of the fishing hook of FIG. 1.
Figure 3:
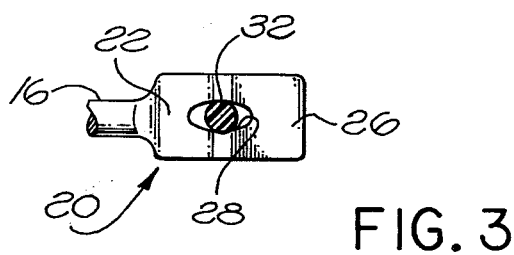
FIG. 3 is a top view, partially broken away, of the fishing hook of FIG. 1.
Figure 4:
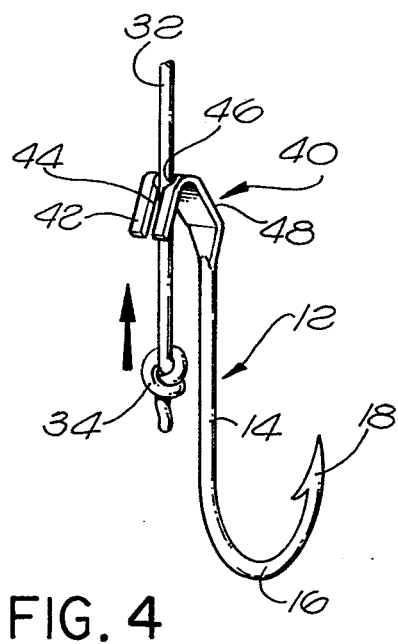
FIG. 4 is a perspective view of an alternative arrangement of the fishing hook in accordance with the invention.
Figure 5:
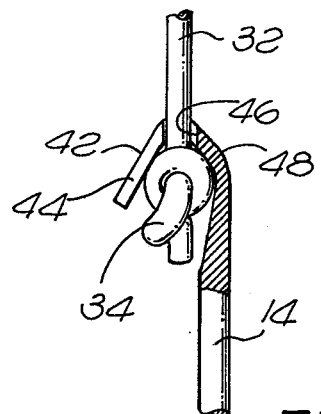
FIG. 5 is a partial side view of the fishing hook of FIG. 4 in section.
Figure 6:
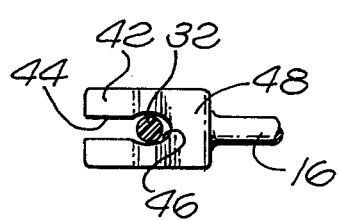
FIG. 6 is a top view, partially broken away, of the fishing hook of FIG. 4.

Referring now to FIGS. 4 through 6 there is shown an alternative arrangement of FIGS. 1 through 3 wherein a fishing line coupler 40 is formed with the outer side follower stretch 42 containing a slot 44. The slot 44 extends from the free end of the outer side follower stretch 42 to one end of an aperture 46 formed in the lead stretch 48. The slot 44 width is approximately that of the leader 32 thus facilitating positioning of the leader in the aperture 46. In addition the arrangement of FIGS. 4 through 6 enable a pre-knotted leader to be utilized with the fishing hook. In other respects the fishing hook of FIGS. 4 through 6 is identical to that of the fishing hook of FIGS. 1 through 3. In addition the arrangement of FIGS. 4 through 6 facilitates removing the leader from the fishing hook as well.

I claim:

1. A fishing hook comprising:
a shank having a barbed point terminating at one end thereof and a fishing hook coupler terminating at the other end thereof, said coupler including:
a wire bent upon itself to define a leading stretch of arcuate contour and of sufficient width at its widest point so that a leader can pass therethrough, a flat inner side follower stretch interconnected at one end of said shank and at one end of said leading stretch, an outer side follower stretch connected at the other end of said leading stretch and terminating in a free end, the inner side follower stretch and said outer side follower stretch defining separate and spaced apart opposed flat adjacent surfaces, and an aperture formed in said leading stretch for enabling a leader to pass therethrough with a knot of said leader lodging in the adjacent surfaces of said inner side follower stretch and said outer side follower stretch.

2. A fishing hook in accordance with claim 1 wherein a slot forms a continuation of said aperture, said slot extending from said aperture to the free end of said outer side follower stretch, said slot being defined by a pair of surfaces spaced apart a distance less than the maximum size of said aperture.

* * * * *